United States Patent
Yamada

[15] 3,683,081
[45] Aug. 8, 1972

[54] SYNERGISTIC FUNGICIDE COMPOSITION CONTAINING PHOSPHORODITHIOLATE DERIVATIVES

[72] Inventor: Yasuo Yamada, Tokyo, Japan
[73] Assignee: Farbenfabriken Bayer Aktiengesellschaft, Leverkusen, Germany
[22] Filed: July 1, 1970
[21] Appl. No.: 51,713

[30] Foreign Application Priority Data
July 10, 1969  Japan ..................44/54225

[52] U.S. Cl. ...................................424/225
[51] Int. Cl. ....................................A01n 9/36
[58] Field of Search ..........................424/225

[56] References Cited
OTHER PUBLICATIONS
Inoue et al. – Chem. Abst. Vol. 70 (1969) page 87274j
Hoffmann– Chem. Abst. Vol. 70 (1969) page 87308y

*Primary Examiner*—Sam Rosen
*Attorney*—Burgess, Dinklage & Sprung

[57] ABSTRACT

Synergistic combination of S-methyl-S-(4-chlorophenyl) phosphorodithiolate and 0-alkyl-S,S-diphenyl phosphorodithiolates which possesses outstanding fungicidal properties.

7 Claims, No Drawings

SYNERGISTIC FUNGICIDE COMPOSITION CONTAINING PHOSPHORODITHIOLATE DERIVATIVES

The present invention relates to and has for its objects the provision of new fungicidal compositions in the form of synergistic combinations of certain individually known compounds, which combinations possesses outstanding fungicidal properties, optionally in the form of carrier composition mixtures of such synergistic combinations with solid and/or liquid dispersible carrier vehicles, and methods for using such synergistic combinations in a new way especially for combating fungi, with other and further objects becoming apparent from a study of the within specification and accompanying examples.

It is known that combinations of certain pesticidally active compounds are synergistic. Insecticidal activity was doubled when two known insecticides were mixed (Japanese Pat. No. 438,268: Japanese Patent Publication No. Sho 39–20729). Initial and residual insecticidal effects of insecticides were increased, compared with the effects of each insecticide alone, when they were mixed (Japanese Pat. No. 490,900: Japanese Patent Publication No. Sho 41–10038). Both fungicidal and insecticidal activities were obtained when a known fungicide and a known insecticide were used in admixture (Japanese Pat. No. 414,130: Japanese Patent Publication No. Sho 38–14944). A broader range of effectiveness was obtained when two known insecticides of different effectiveness were mixed (Japanese Pat. No. 469,435: Japanese Patent Publication No. Sho 40–22399). It was an object of these inventions synergistically to enhance the known biological activities of the used chemicals or to add these properties.

It has been found, in accordance with the present invention, that a synergistic fungicidal effect is obtained by combining (a) O-β-chloroisopropyl-S-methyl-S-(4-chloro-phenyl)phosphorodithiolate of the formula

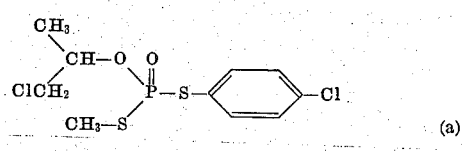

and (b) an O-alkyl-S,S-diphenyl-phosphorodithiolate of the formula

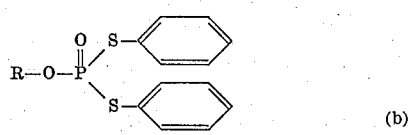

in which

R is an ethyl or propyl radical, alone or in admixture with a diluent or carrier.

The ratio of the active compounds of the formulae (a) to (b) is normally 2 to 1:1, by weight, and these active compounds may be formulated into conventional pesticidal formulations before use.

The fungicidal compositions according to the present invention comprise, as active ingredients, organic phosphoric acid esters of two types, which have different fungicidal properties, in admixture. These compositions as a result of the synergisitic action of the compounds, possess an excellent effectiveness in the control of blast and sheath blight of rice, which is unobtainable by the use of the individual compounds alone.

The new mixed fungicidal compositions for rice cultivation are characterized by synergistically-produced excellent protective, curative and residual effects against *Piricularia oryzae* and *Pellicularia sasakii*, and excellent adaptability in usage. These compounds also possess low toxicity to humans and cattle.

The controlling effect of the compositions of the invention against sheath blight of rice is strong enough to be put to more effective practical use than that of any of the compounds used alone. In the control of blast, the curative and protective effects each compound possesses are synergistically, increased thus the application period of the compounds is prolonged and consequently their residual effect is enhanced. These features brought about by the mixture of two compounds permit the simultaneous control of blast and sheath blight of rice. These merits provide excellent fungicidal compositions which greatly reduce the expenditure of labor in agricultural endeavors.

O-β-chloroisopropyl-S-methyl-S-(4-chlorophenyl)-phosphorodithiolate is known and may be prepared by any convenient method available to those skilled in the art.

The compounds of the general formula (b) are members of a class of fungicidal compounds described in Dutch Pat. No. 66–11860.

However, among these compounds, those which possess alkyl radicals of two or three carbon atoms and a non-substituted phenyl radical are particularly effective against blast of rice. Surprisingly, we have found that when the O-chloroisopropyl-S-methyl-S-(4-chlorophenyl)phosphorodithiolate represented by formula (a) and an O-alkyl-S,S-diphenylphosphorodithiolate of the general formula (b) are mixed, the product possesses new and quite advantageous properties as a controlling agent of the diseases of rice plants as stated above.

Rice plants are attacked not only by insect pests, but also by various kinds of plant pathogenic fungi during the cultivation period. In particular, the damage caused by blast and that caused by sheath blight often occur at the same time during the growing period of rice plants. Therefore, chemicals which possess good activity against blast, but which do not possess practical activity against sheath blight, or vice versa, are not efficient from the standpoint of practical disease control, since the application of chemicals of different activities is required during a period in which both diseases are likely to break out. For this purpose, compositions comprising a mixture of a chemical which is effective against blast and an organic arsenic compound which is effective against sheath blight have usually been used up to the present. However the mixing of compounds containing heavy metals with other chemicals is not expedient from the standpoint of formulation techniques, as well giving rise to problems of toxicity to humans and cattle.

According to the studies we have conducted, the organic phosphoric acid ester fungicides of the formula (a) and (b), as well as organic phosphoric acid esters heretofore developed, when used individually lack one or two of three desirable properties namely, a protective effect, a curative effect and a residual effect against rice diseases. Particularly, these compounds were not sufficiently effective for the simultaneous control of blast and sheath blight compared with the powerful fungicides containing heavy metals so far used.

It was a genuinely unexpected result that these problems would be solved by the use of the organic phosphoric acid esters of the formula (a) and the general formula (b) in combination according to the present invention. The fungicidal composition according to the present invention avoids the common defects of the synthetic organic compounds which have been on the market and marks the development of a rice fungicide which can be used in place of the organic mercury compounds and the like containing heavy metals harmful to humans and cattle.

The influence of the chlorine atom substituted on the isopropyl radical and another chlorine atoms substituted on the phenyl nucleus of the compound of the formula (a) is believed to be significant having regard to the durability of fungicidal activity.

The esters represented by the general formula (b) are O-ethyl-S,S-diphenylphosphorodithiolate and O-isopropyl- and O-n-propyl-S,S-diphenylphosphorodithiolates. These esters are obtained according to the method described in Dutch Pat. No. 66–11810.

The fungicidal compositions according to the present invention show a remarkable effectiveness against serious diseases of rice plants such as blast and sheath blight as stated before; however, these are also effective in the control of other diseases of rice plants such as Helminthosporium leaf spot (*Cochliobolus miyabeanus*), stem rot (*Helminthosporium sigmoideum*) and bacterial leaf blight (*Xanthomonas oryzae*).

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents, as well as developing agents, spreaders and adhesives. In the case of the use of water as an extender, organic solvents can, for example, also be used as auxiliary solvents.

As liquid diluents or carriers, there are preferably used aromatic hydrocarbons, such as toluene, xylenes, dimethylnaphthalene, aromatic naphthas or benzene; chlorinated aromatic hydrocarbons, such as chlorobenzenes; cyclohexane; paraffins, such as mineral oil fractions; alcohols, such as methanol, ethanol, propanol or butanol; or strongly polar solvents, such as acetonitrile, dimethyl formamide or dimethyl sulfoxide, as well as water. Also suitable are chlorinated aliphatic compounds, such as methylene dichloride, chloroethylene or carbon tetrachloride, and ketones, such as acetone, cyclohexanone or methylethyl ketone.

As solid diluents or carriers, there are preferably used ground natural minerals, such as montmorillonite, bentonite, atapulgite, diatomaceous earth, kaolins, clays, talc or calcium carbonate, for example chalk, or ground synthetic minerals, such as highly-dispersed silicic acid or silicates, or alumina.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing agents include lignin, sulfite waste liquors and methyl cellulose.

As gaseous diluents or carriers, dichlorodifluoromethane (Freon) or other gases commonly used as propellants in aerosol sprays may be used.

Other active compounds, such as insecticides, nematocides, fungicides (including antibiotics), herbicides, plant-growth regulators or fertilizers, can be present in the fungicidal compositions of the present invention.

The fungicidal compositions according to the present invention contain, in general, 0.1 to 95 percent, preferably 0.5 to 90 percent by weight of the total active compounds. The amount of active compounds contained in the compositions can be varied according to the types of formulations, methods of application, and the purpose, time and place of application as well as the conditions of outbreak of diseases.

Active compounds according to the present invention can be used as they are, in the form of their formulations or of the application forms prepared therefrom, such as solutions, emulsions, emulsifiable concentrates, wettable powders, soluble powders, oils, aerosols, pastes, fumigants, dust, granules, pellets, tablets, and the like.

These compositions may be applied, for example by watering, spraying, atomizing, dusting, scattering, fumigating, drenching and dressing, to plant pathogenic fungi and/or their habitat. The active compounds according to the present invention can also be used in accordance with the well-known ultralow-volume (ULV) process. According to this method, the preparation to be applied contains up to 95 percent by weight of the total active compounds or, in some cases, even the active compounds alone.

The amount of active compounds in the ready-to-use preparations can be varied within a fairly wide range. Generally, the amount is 0.005 to 10 percent by weight, preferably 0.01 to 5.0 percent by weight of the total active compounds.

The amount of total active compounds applied is generally about 0.15 – 10 kg, preferably 0.4 – 6 kg, per hectare. However, in special cases, it is possible to exceed or reduce the amount and, actually, it is sometimes necessary.

The present invention also provides a method of combating fungi which comprises applying to the fungi or a fungus habitat a composition of the present invention.

The present invention further provides crops, especially rice, protection from damage by fungi by being grown in areas in which immediately prior to and/or during the time of the growing a composition of the present invention was applied.

It will realized, of course, that the concentration of the particular synergistic mixture of said two active compounds utilized in admixture with the carrier vehicle will depend upon the intended application, and such concentration may be varied within fairly wide limits. Therefore, in special cases, it is possible to go above or below the aforementioned concentration ranges.

Compositions according to the present invention are illustrated in and by the following Formulations.

FORMULATION I 50 percent by weight of a mixture (1:1) of active compounds of the formula (a) and the general formula (b), 20 percent by weight of emulsifying agent (alkylaryl polyglycol ether) and 30 percent of a solvent (xylene) are mixed and stirred to form a homogeneous emulsifiable concentrate. It is diluted with water (1:1,000–2,000) to give a ready-to-use preparation for spraying, and applied to plant pathogenic fungi or their habitat using a sprayer.

FORMULATION II

The active compound of the formula (a) and a compound of the general formula (b) are individually formulated into an emulsifiable concentrate to a desired concentration (1:500–1,000) and mixed (1:1, tank mixture method) shortly before application to give a ready-to-use preparation, and sprayed according to the method stated in Formulation I.

FORMULATION III 25 percent by weight of a mixture (1.5:1) of the active compound of the formula (a) and a compound of the general formula (b), 7 percent by weight of an emulsifying agent (alkylaryl polyglycol ether) and 68 percent by weight of an inert mineral fine powder (a 1:5 mixture of diatomaceous earth and clay) are pulverized to provide a wettable powder. It is used after dilution to a desired concentration (about 1:250–1,000) with water to give a ready-to-use preparation, and applied according to the method stated in Formulation I.

FORMULATION IV 2 percent by weight of a mixture (1:1) of the active compound of the formula (a) and a compound of the general formula (b) and 98 percent by weight of a mixture (3:1) of talc and clay are mixed in a mixing apparatus e.g. Lödecke mixer) and homogenized in a grinding mill to provide a dust formulation. It is dusted onto rice plants in an amount of 3–4 kg per 10 ares using a duster.

FORMULATION V

A mixture (1:1) of the active compound of the formula (a) and a compound of the general formula (b) is dissolved in a solvent e.g. acetone). It is sprayed onto clay granules of 0.2–1 mm diameter while rotating in a mixing apparatus (e.g. V-shaped mixer) so that about 5 percent of weight of the mixed active compounds are contained therein. Granular formulations are obtained after evaporation of the solvent and drying. This formulation is applied to the surface of water or soil in paddy fields in an amount of 4–6 kg per 10 ares using a sprayer.

The outstanding fungitoxic effectiveness of the synergistic mixture of said two active compounds according to the present invention, as well as their distinct superiority compared with the use of such particular active compounds separately, can be seen, by way of illustration and without limitation, from the following experimental test results:

EXAMPLE 1

Protective, curative and residual effect tests against blast of rice plants were carried out using O-$\beta$-chloroisopropyl-S-methyl-S-(4-chlorophenyl)phosphorodithiolate and O-ethyl and O-isopropyl-S,S-diphenyl phosphorothiolates individually and in admixture in the form of an emulsifiable concentrate and a dust formulation. The results are given in Tables 1 and 2.

Test Procedure:

A) Protective and Residual Effect Test Against Blast of Rice Plant

Paddy rice plants (Jukkoku variety) were cultivated in pots of 12 cm diameter. Active compounds and fungicidal compositions according to the present invention were sprayed at the prescribed concentrations on the rice plants at their tillering stage. Emulsions were sprayed in an amount of 50cc per three pots at a pressure of 1.5 kg/cm² so that the blades of the rice plants became dripping wet. Spraying was carried out by placing pots on a turn-table which moved in conjunction with discharge of the chemical from the nozzle of a spray-gun. Prescribed amounts of dust formulation were dusted uniformly onto the test plants under a reduced pressure of 200 mmHg using a big bell-jar duster.

The sprayed rice plants, after a lapse of 1 day and of 5 days after the chemical treatment, were placed in a moisture chamber kept at 25° C and 100 percent humidity for 2 days. During that time, a spore suspension of *Piricularia oryzae* (50,000–100,000 spores/ml) which had been prepared by culture was sprayed onto the rice plants for inoculation.

The direct protective effect was evaluated from the rice plants which had been inoculated 1 day after the chemical treatment and the duration of the protective effect was determined from those plants which had been inoculated 5 days after the chemical treatment.

Seven days after the inoculation, the infestation rate was evaluated for the first and second developing leaves of 10 stems selected per pot according to the following definition. The damage rate was calculated according to the equation shown below.

Phytotoxicity against rice plants was also evaluated.

| Infestation rate | Percentage of disease spot area |
|---|---|
| 0 | 0 % |
| 0.5 | 0 – 2 % |
| 1 | 2 – 5 % |
| 2 | 5 – 10% |
| 3 | 10 – 20% |
| 4 | 20 – 40% |
| 5 | >40 % |

$$\text{Damage rate} = \frac{1/2 n_{0.5} + n_1 + 2n_2 + 4n_3 + 8n_4 + 10n_5}{10N} \times 100$$

in which $N$ ... The number of all the leaves observed.

$n_{0.5}$ ... The number of leaves with an infestation rate of 0.5.

.

.

.

$n_5$ ... The number of leaves with an infestation rate of 5.

B) Curative Effect Test Against Blast of Rice Plants

This test was carried out in order to examine the curative activity of the present compounds against pathogenic fungi which had infested the plant body.

Paddy rice plants were placed in a moisture chamber kept at 25° C and at 100 percent humidity for 2 days. During that time, a spore suspension of *Piricularia oryzae* was sprayed for inoculation. On the day after infestation, active compounds and fungicidal compositions according to the present invention were sprayed at the prescribed concentration in the same manner as in the protective effect test.

Six days after chemical spraying, the infestation rate per pot was evaluated in the same manner as in the protective effect test and the damage rate was calculated.

TABLE 1

Test Results Against Blast of Rice Plants Using an Emulsion

| Active Compounds | Concentration of active compounds(%) | Protective effect | Damage rate Residual effect | Curative effect | Phytotoxicity |
|---|---|---|---|---|---|
| I | 0.02 | 1.7 | 9.0 | 40.4 | – |
|  | 0.04 | 0 | 4.2 | 32.4 | – |
| II-a | 0.02 | 6.1 | 38.0 | 8.7 | – |
|  | 0.04 | 1.3 | 26.0 | 4.1 | – |
| II-b | 0.02 | 5.2 | 36.8 | 12.9 | – |
|  | 0.04 | 2.5 | 24.2 | 5.7 | – |
| I + II-a (1:1) | 0.02 | 0 | 4.7 | 7.9 | – |
|  | 0.04 | 0 | 0 | 1.8 | – |
| I + II-b (1:1) | 0.02 | 0 | 5.5 | 9.2 | – |
|  | 0.04 | 0 | 0 | 2.5 | – |
| Non-treatment | – | 43.2 | 47.4 | 51.5 | – |

TABLE 2

Test Results Against Blast of Rice Plants Using a Dust Formulation

| Active Compounds | Amount of active compound used per 10 a. | Protective effect | Damage rate Durative effect | Curative effect | Phytotoxicity |
|---|---|---|---|---|---|
| I 2% dust | 2 kg | 4.2 | 17.4 | 44.2 | – |
|  | 4 | 0 | 8.0 | 36.0 | – |
| II-a 2% dust | 2 | 16.5 | 41.5 | 18.9 | – |
|  | 4 | 5.3 | 12.3 | 5.4 | – |
| I + II-a (1:1) 2% dust | 2 | 0 | 9.1 | 16.4 | – |
|  | 4 | 0 | 2.5 | 2.8 | – |
| Non-treatment | – | 43.3 | 50.7 | 57.8 | – |

Notes: 1.

I : O-β-chloro-isopropyl-S-methyl-S-(4-chloro-phenyl)phosphorodithiolate

II–a : O-ethyl-S,S-diphenylphosphorodithiolate

II–b : O-isopropyl-S,S-diphenylphosphorodithiolate

2. - means no bad influence on the growth of rice plants.

It will be realized by the artisan that the synergistic combinations of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such synergistic combination of compounds to be used with correspondingly favorable compatibility with warm-blooded creatures and plants for more effective control and/or elimination of fungi by application of such synergistic combination of compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Synergistic fungicidal composition which comprises a synergistic combination of (a) O-β-chloroisopropyl-S-methyl-S-(4-chlorophenyl)-phosphorodithiolate of the formula

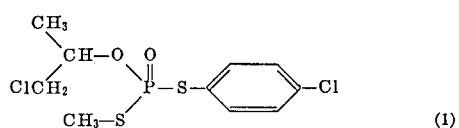

(1)

and (b) an O-alkyl-S,S-diphenyl phosphorodithiolate of the formula

(2)

in which

R is an ethyl or propyl radical, alone or in admixture with a diluent or carrier, the ratio of compounds (a) to (b) being 1 to 2 parts by weight of (a) to 1 part by weight of (b).

2. Synergistic fungicidal composition according to claim 1 wherein (b) is O-ethyl-S,S-diphenyl phosphorodithiolate.

3. Synergistic fungicidal composition according to claim 1 wherein (b) is O-isopropyl-S,S-diphenyl phosphorodithiolate.

4. Synergistic fungicidal composition according to claim 1 wherein (b) is O-n-propyl-S,S-diphenyl S-diphenyl phosphorodithiolate.

5. Synergistic fungicidal composition according to claim 1 containing from 0.1 to 95 percent of total active ingredients, by weight.

6. Synergistic fungicidal composition according to claim 5 containing from 0.5 to 90 percent of total active ingredients, by weight.

7. A method of combating fungi which comprises applying to the fungi or a fungus habitat a composition according to claim 1.

* * * * *